United States Patent
Yun

(10) Patent No.: US 7,047,032 B2
(45) Date of Patent: May 16, 2006

(54) POWER CONTROLLABLE WIRELESS MOBILE COMMUNICATIONS SYSTEM OF ADAPTIVE MODULATION AND CODING SCHEME AND METHOD THEREFOR

(75) Inventor: Sang-boh Yun, Seongnam (KR)

(73) Assignee: Samsung Electronics Co., Ltd., Suwon (KR)

(*) Notice: Subject to any disclaimer, the term of this patent is extended or adjusted under 35 U.S.C. 154(b) by 598 days.

(21) Appl. No.: 10/373,682

(22) Filed: Feb. 27, 2003

(65) Prior Publication Data

US 2004/0203992 A1 Oct. 14, 2004

(30) Foreign Application Priority Data

Apr. 25, 2002 (KR) ............... 2002-22703

(51) Int. Cl.
*H04Q 7/20* (2006.01)

(52) U.S. Cl. .............. 455/522; 455/69; 455/67.11; 375/260; 375/285

(58) Field of Classification Search ........... 455/522, 455/69, 67.11, 67.15, 414, 450, 63, 452; 375/260, 285, 298, 308; 370/335, 342

See application file for complete search history.

(56) References Cited

U.S. PATENT DOCUMENTS

| 5,835,527 A | 11/1998 | Lomp |
| 6,137,840 A | 10/2000 | Tiedemann, Jr. et al. |
| 6,167,031 A | 12/2000 | Olofsson et al. |
| 6,262,994 B1 | 7/2001 | Dirschedl et al. |
| 6,934,556 B1* | 8/2005 | Takano ................ 455/522 |
| 2002/0193133 A1* | 12/2002 | Shibutani ............. 455/522 |
| 2003/0022672 A1* | 1/2003 | Yoshii et al. ......... 455/450 |
| 2003/0054807 A1* | 3/2003 | Hsu et al. ............ 455/414 |
| 2003/0153276 A1* | 8/2003 | Terry et al. .......... 455/69 |
| 2005/0075078 A1* | 4/2005 | Makinen et al. ...... 455/67.15 |

FOREIGN PATENT DOCUMENTS

| DE | 198 50 050 | 3/2000 |
| JP | 2001-515307 | 9/2001 |
| WO | 01/31824 A1 | 5/2001 |

* cited by examiner

*Primary Examiner*—Tilahun Gesesse
*Assistant Examiner*—Tan Trinh
(74) *Attorney, Agent, or Firm*—Lee & Morse, P.C.

(57) ABSTRACT

A power controllable wireless mobile communications system using an adaptive modulation and coding scheme includes a signal-to-noise ratio (SNR) extracting unit which extracts a SNR from a received signal that is processed using a predetermined first modulation and coding scheme; a modulation and coding scheme determining unit which compares the extracted SNR with a first requested SNR for the received signal and determines a second modulation and coding scheme; a power control value determining unit which compares the extracted SNR with a second requested SNR for a signal of the second modulation and coding scheme and determines a power control value; and a signal generating unit which inserts a field indicating the second modulation and coding scheme and a power control command field for the power control value, into data to be transmitted, processes a resulting signal according to the second modulation and coding scheme, and generates a transmission signal.

12 Claims, 4 Drawing Sheets

POWER CONTROLLABLE WIRELESS MOBILE COMMUNICATIONS SYSTEM OF ADAPTIVE MODULATION AND CODING SCHEME AND METHOD THEREFOR

BACKGROUND OF THE INVENTION

1. Field of the Invention

The present invention relates to a power controllable wireless mobile communications system employing an adaptive modulation and coding scheme and a method therefor. More particularly, the present invention relates to an apparatus that controls output power of a mobile station in a mobile communications system employing an adaptive modulation and coding scheme by using a signal-to-noise ratio (SNR) extracted from a backward signal that is transmitted from the mobile station to a base station and a method therefor.

2. Description of the Related Art

In general, the ultimate aim of power control in a wireless communications system is to provide a predetermined quality to communications channels by compensating for signal attenuation in wireless channels such that a signal is received at an appropriate signal level requested by a receiving end. Also, as wireless communications networks have evolved to cellular networks, power control has become an important factor in system performance and system capacity due to co-channel interference or multi-user interference. Particularly, in a code division multiple access (CDMA)-type mobile communications system, the capacity of the system is determined by the signal-to-noise ratio (SNR) at a receiving end. If a requested SNR (SNR_REQ), which is a predetermined signal level requested by a demodulation end, is maintained, the number of simultaneous users on the system may be increased. Accordingly, if a near-far problem in the backward direction is minimized by properly adjusting each user's power control, a frequency efficiency that is higher than that of other transmission methods may be attained.

An example of a power control method in a conventional mobile communications systems is a fixed step-size closed-loop power control (FCLPC) method recommended by Interim Standard (IS)-95. In the FCLPC method, a base station measures the strength of a signal received from a mobile station (or a terminal) and then transmits a power control command to the mobile station. If the strength of the received signal is lower than a requested SNR, the base station sets a power control bit contained in the power control command to '0' so that the transmission signal strength of the mobile station is increased by 1 dB. If the strength of the signal is higher than the requested SNR, the base station sets the power control bit to '1' so that the transmission signal strength is decreased by 1 dB. That is, in this method the scope of changes in the transmission power of the mobile station is fixed at ±1 dB. While such a technique may be effective for a situation where the signal is changed slowly and gradually, it is not appropriate where the signal is widely or rapidly changing because this method has a limited converging speed.

Recently, in order to provide high speed transmission rates, modulation methods having high frequency efficiency have been employed. However, if channel states are poor, the modulation methods having high frequency efficiency cannot be used. Therefore, an adaptive modulation and coding (AMC) scheme is used in which a modulation method and channel coding scheme can be adaptively selected according to the state of channels. In a system employing the AMC scheme, the SNR requested by a receiving end varies according to a threshold scheme that may graphically be represented in the shape of a staircase.

FIG. 1 illustrates a graph showing changes of requested SNR with respect to time in a mobile communications system employing the adaptive modulation and coding (AMC) scheme and changes of SNR with respect to time according to a conventional power control method. In the graph, the smooth curve indicates the requested SNR when the modulation method and coding changes from 64 quadrature amplitude modulation (QAM)+¾ to quadrature phase-shift keying (QPSK)+¾ according to the AMC scheme and the staircase-shape line indicates the SNR using a conventional power control method. Specifically, the graph shows that the conventional method cannot satisfy the requested SNR in real time.

That is, the conventional power control method does not consider the AMC scheme where the SNR changes rapidly in each packet or frame. Accordingly, the conventional power control method cannot provide real-time control and may cause cutoffs during calls due to an unstable receiver signal, and may also cause adverse side effects such as decreasing the number of simultaneous users capable of being on the system due to inefficient use and waste of signal transmission power. In addition, if all mobile stations in a cell or in a network exhibited the result shown in FIG. 1, a decrease in channel capacity may occur.

To solve the above problem, methods for variable power control with respect to changes in the level of a signal based on the moving speed of a mobile station have been proposed. However, these methods consider the changing scope of a signal with respect to the moving speed of a mobile station, assuming that an identical modulation and demodulation method is employed. Accordingly, these methods are not optimized for the AMC scheme in which modulation and demodulation schemes change. Therefore, a power control method appropriate to a system employing the AMC scheme is needed.

SUMMARY OF THE INVENTION

In an effort to overcome the problems described above, it is a feature of an embodiment of the present invention to provide a mobile communications system employing an adaptive modulation and coding (AMC) scheme, in which the system adjusts the output power of a mobile station according to a changing scheme when a modulation and coding scheme changes, and a method therefor.

According to a feature of an embodiment of the present invention, there is provided a mobile communications system employing an adaptive modulation and coding scheme, the system including a base station and one or more mobile stations. The base station preferably includes a signal-to-noise ratio (SNR) extracting unit which extracts a SNR from a received signal that is processed using a predetermined first modulation and coding scheme; a modulation and coding scheme determining unit which compares the extracted SNR with a first requested SNR for the received signal, and determines a second modulation and coding scheme reflecting conditions that include the result of the comparison; a power control value determining unit which compares the extracted SNR with a second requested SNR for a signal of the second modulation and coding scheme, and determines a power control value according to the result of the comparison; and a signal generating unit which inserts a field indicating the second modulation and coding scheme, and a power control command field corresponding to the power control value, into data to be transmitted, processes a resulting signal according to the second modulation and coding scheme, and generates a transmission signal. The mobile communications system may further include a SNR storage unit for storing a plurality of predetermined SNRs requested for signals processed by each modulation and coding scheme. The mobile station preferably further includes a command extracting unit which extracts the power control command field and the field indicating the second modulation and coding scheme from the signal transmitted by the signal generating unit; a processing unit which computes a power level according to a power control command of the power control command field, processes data to be transmitted according to the content of the field indicating the modulation and coding scheme, and generates a signal to be transmitted to the SNR extracting unit in the base station; and an amplifying unit which amplifies the signal generated in the processing unit according to the power level and transmits the amplified signal. The amplifying unit may be placed between the SNR extracting unit and the processing unit.

According to another aspect of an embodiment of the present invention, there is provided a mobile communications method employing an adaptive modulation and coding scheme, the method including (a) extracting a SNR from a received signal which is processed using a predetermined first modulation and coding scheme; (b) comparing the extracted SNR with a first requested SNR for the received signal, and determining a second modulation and coding scheme reflecting conditions including at least the result of the comparison; (c) if the second modulation and coding scheme determined in (b) is different from the first modulation and coding scheme, comparing the extracted SNR with a second requested SNR for a signal of the second modulation and coding scheme, and determining a power control value according to the result of the comparison; and (d) inserting a field indicating the second modulation and coding scheme and a power control command field corresponding to the power control value into a data signal to be transmitted, processing the resulting signal according to the second modulation and coding scheme and generating a transmission signal. Preferably, the first and second requested SNRs are from among a plurality of SNRs stored in a table of SNRs, each SNR being associated with a specific modulation and coding scheme. If in (c) the second modulation and coding scheme determined in (b) is the same as the first modulation and coding scheme, the power control value may be determined to be adjusted by a predetermined change value as in a conventional fixed step-size closed-loop power control (FCLPC) method. The method preferably further includes (e) extracting the power control command field and the field indicating a modulation and coding scheme from a signal which is generated and transmitted in (d); (f) computing a power level according to the power control command of the power control command field, processing data to be transmitted according to the content of the field indicating the modulation and coding scheme, and generating a signal to be transmitted to the SNR extracting unit; and (g) amplifying the signal generated in (f) by the power level and transmitting the signal. The method may further include (h) repeating (a) through (g).

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Priority Korean Patent Application No. 2002-22703, filed Apr. 25, 2002, and entitled "Power Controllable Wireless Mobile Communications System of Adaptive Modulation and Coding Scheme and Method Therefor" is incorporated by reference herein in its entirety.

Figure 1:
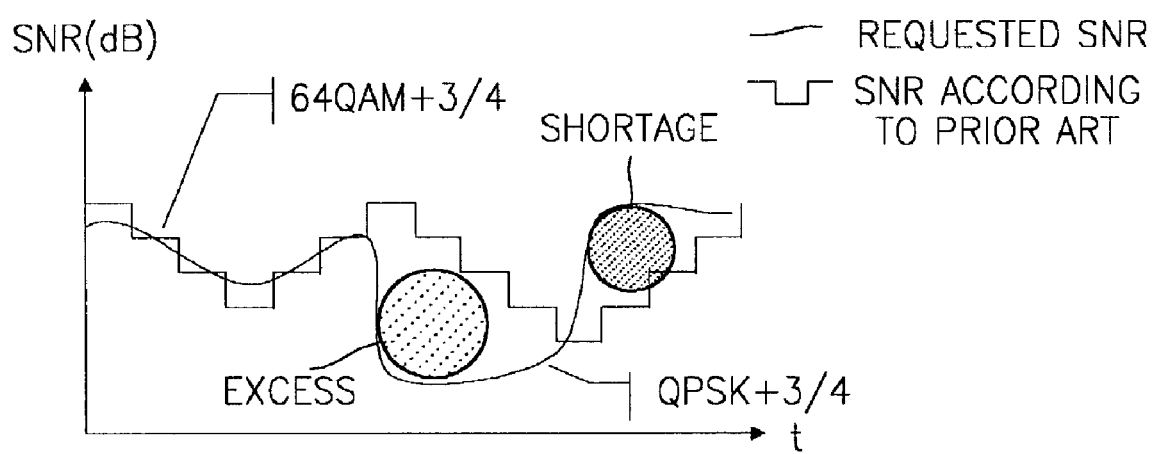
FIG. 1 illustrates a graph showing changes of requested SNR with respect to time in a mobile communications system employing an adaptive modulation and coding (AMC) scheme and changes of SNR with respect to time according to a conventional power control method.
Figure 2:
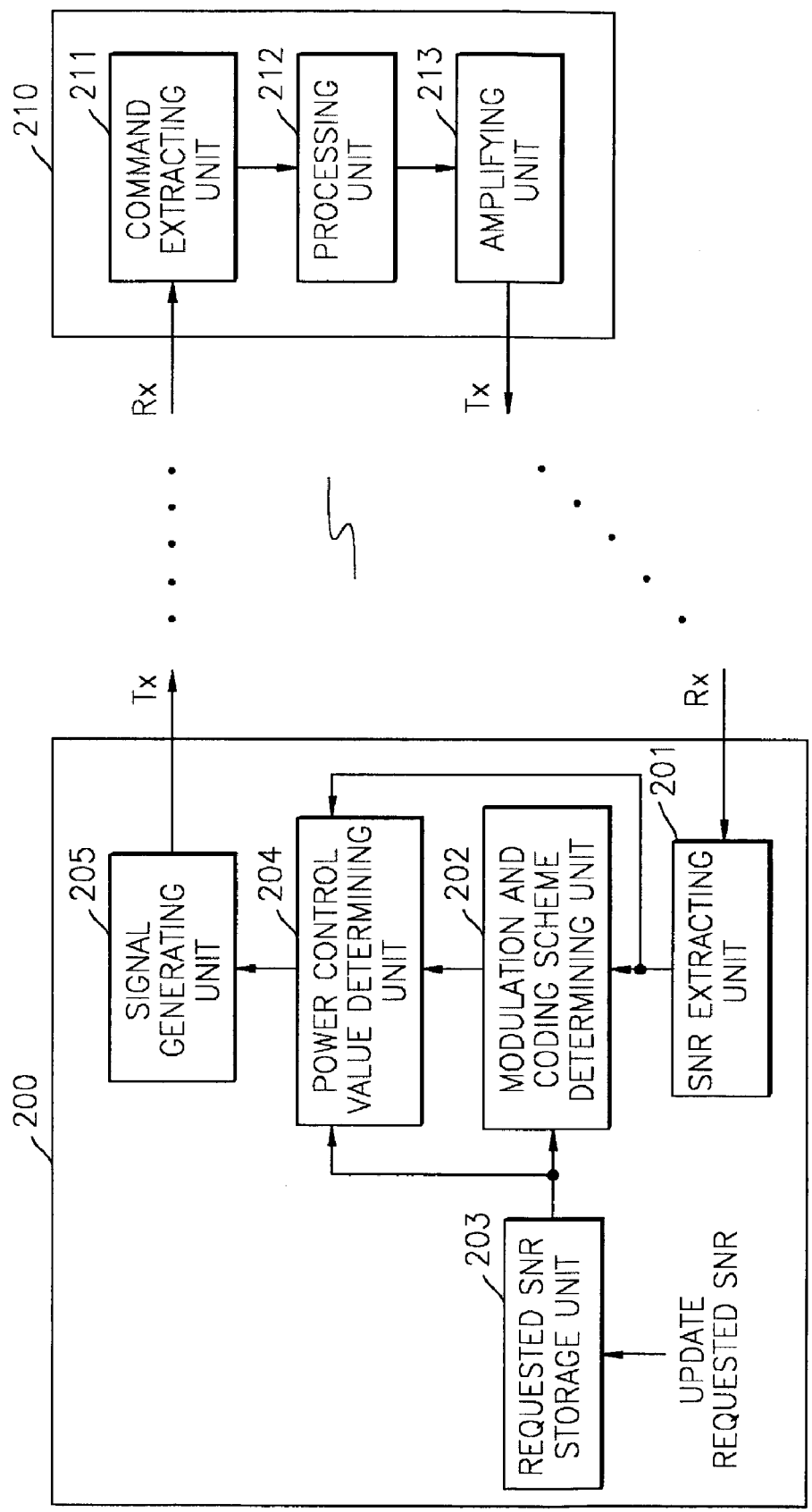
FIG. 2 illustrates a block diagram of a mobile communications system employing the AMC scheme according to the present invention.
Figure 3:
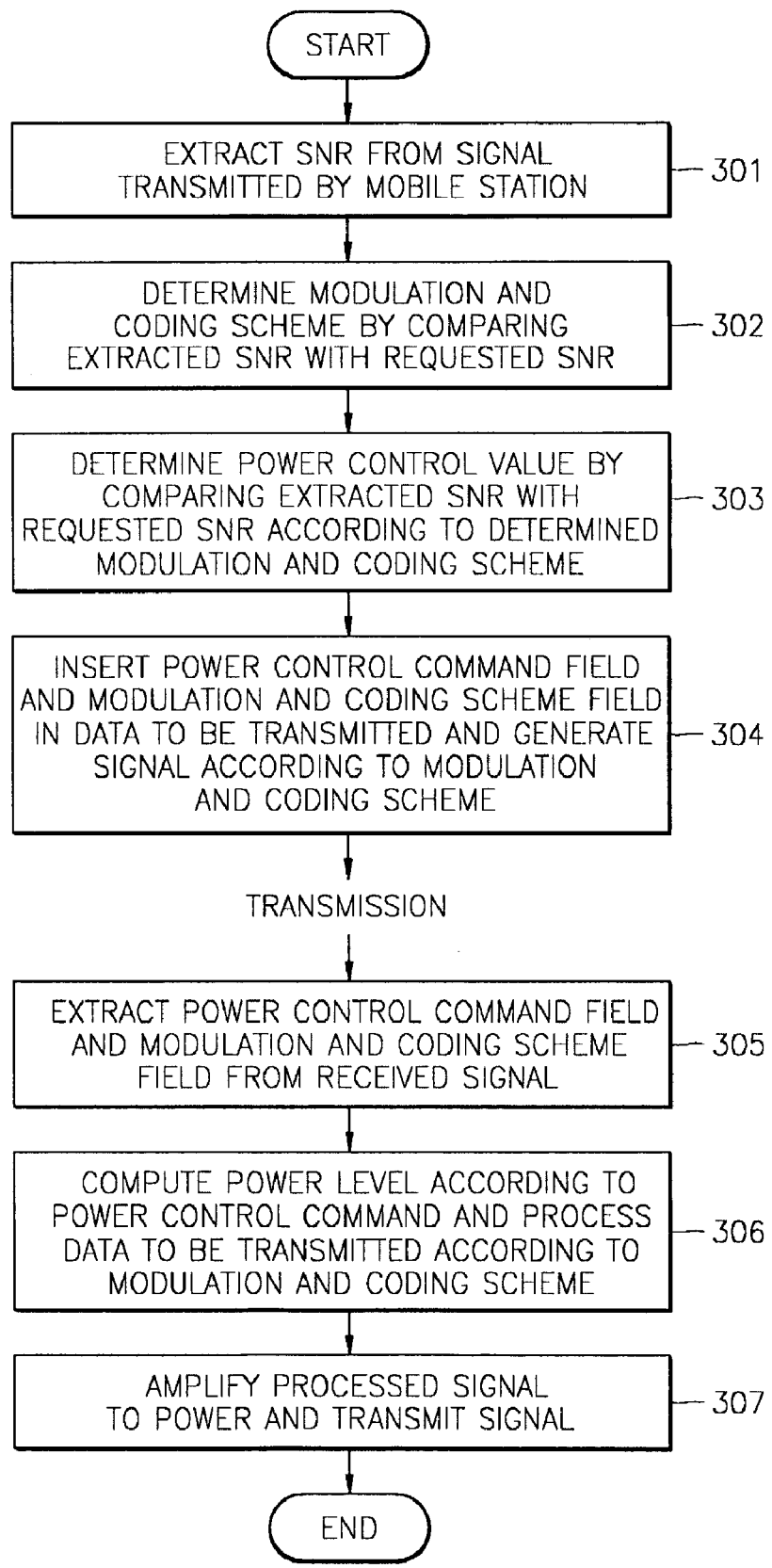
FIG. 3 illustrates a flowchart of a mobile communications method employing the AMC scheme according to the present invention.

FIG. 2 illustrates a block diagram of a mobile communications system employing an AMC scheme according to the present invention, and FIG. 3 is a flowchart illustrating a mobile communications method employing the AMC scheme according to the present invention.

Referring to FIG. 2, a cell of the mobile communications system preferably comprises a base station 200 and a mobile station 210. The base station 200 preferably further includes an SNR extracting unit 201, a modulation and coding scheme determining unit 202, a requested SNR storing unit 203, a power control value determining unit 204, and a signal generating unit 205. The mobile station 210 preferably further includes a command extracting unit 211, a processing unit 212, and an amplifying unit 213. The operation of each element will now be explained with reference to the flowchart of FIG. 3.

The SNR extracting unit 201 extracts the SNR from a first output signal transmitted by the mobile station 210 in step 301. The modulation and coding scheme determining unit 202 compares the extracted SNR with the requested SNR and as a result of that comparison, determines in step 302: 1) whether the current modulation and coding scheme should be changed; and 2) if a change is required, which scheme should be selected. Normally, the power scope of a signal used in a mobile communications system employing the AMC scheme is relatively wider than that of a signal used in a system not employing the AMC scheme and therefore determining a modulation and coding scheme for one mobile station in the former system has a greater influence on the overall performance of the cell. Accordingly, in order to maintain more stable capacity and performance, the determination of a modulation and coding scheme should consider the load of the entire cell or the entire network as well as the channel state of the subject mobile station.

The requested SNR storing unit 203 preferably stores the SNR requested by signal type. For example, the requested SNR storing unit 203 preferably stores the SNRs requested by respective modulation and coding schemes as in table 1, where rows A–C represent different modulation schemes and columns a–c represent different coding schemes associated with each modulation scheme. Each combination of modulation and coding is optimized at a unique SNR.

TABLE 1

| Modulation/coding scheme | a | b | c |
|---|---|---|---|
| A | SNR Aa | SNR Ab | SNR Ac |
| B | SNR Ba | SNR Bb | SNR Bc |
| C | SNR Bc | SNR Cb | SNR Cc |

The requested SNR may be determined theoretically, or may be generated or updated according to a Quality of Service (QoS) measure, such as a bit error rate, which a system should provide based on experimental results according to changes in bit error rates and frame error rates in a predetermined area or under a predetermined channel environment.

The power control value determining unit 204 preferably reads a requested SNR corresponding to the selected modulation and coding scheme in the modulation and coding scheme determining unit 202, from the requested SNR storing unit 203, compares the requested SNR with the extracted SNR, and determines a power control value in step 303. The power control value may be determined with respect to the difference between the extracted SNR and the requested SNR, and can be expressed in an index form indicating the extent of power increase or decrease with respect to the difference between the extracted SNR and the requested SNR. In this case, the mobile station 210 may additionally include a storage unit for storing the power increase and reduction values corresponding to the indices. If the modulation and coding scheme determining unit 202 determines that the modulation and coding scheme is to remain unchanged, the power control value determining unit 204 may determine a power control value according to a conventional FCLPC method. In this case, only the result of the comparison of the extracted SNR with the requested SNR would be considered in determining a power control value.

The signal generating unit 205 preferably inserts a power control command field and a field indicating the modulation and coding scheme into data to be transmitted, processes the data according to the determined modulation and coding scheme to generate a second output signal, and transmits the second output signal to the mobile station 210 in step 304. Upon reception of the transmitted signal in the mobile station 210, the command extracting unit 211 extracts the power control command field and the modulation and coding scheme field contained in the received signal in step 305.

The processing unit 212 computes a power level according to the command value of the extracted power control command field, processes data to be transmitted according to the modulation and coding scheme in the modulation and coding scheme field, and generates a new first output signal in step 306. The amplifying unit 213 amplifies the first output signal according to the power value computed in the processing unit 212 and transmits the amplified first output signal to the base station 200 in step 307, and the foregoing process is repeated.

Figure 4:
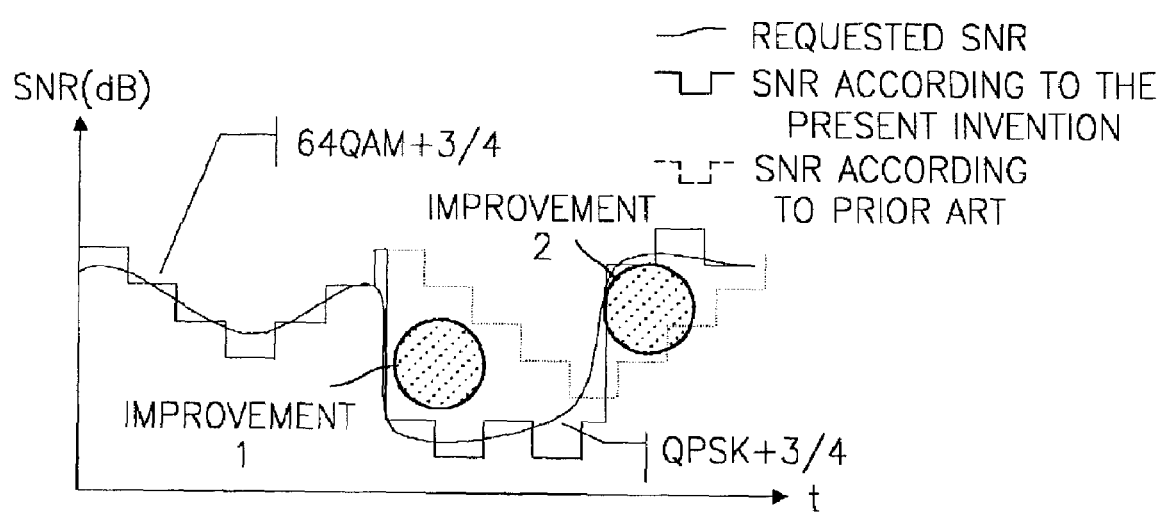
FIG. 4 illustrates a graph comparing changes of SNRs of the present invention and prior art.

FIG. 4 illustrates a graph showing changes of SNRs according to the present invention as compared with changes that occur when using the prior art. Referring to FIG. 4, the smooth curve indicates the requested SNR when the modulation method and coding changes from 64 quadrature amplitude modulation (QAM)+¾ to quadrature phase-shift keying (QPSK)+¾ according to the AMC scheme. The staircase-shape solid line indicates the SNR according to the power control embodiment of the present invention. The staircase-shape dotted line indicates the SNR according to the conventional power control implementations. The graph shows that the SNR according to the present invention well matches the requested SNR while the conventional method cannot satisfy the requested SNR.

According to the present invention, as shown in FIG. 4, the high-speed convergence into the requested SNR enables real-time control of the transmission power of a mobile station thereby minimizing waste of transmission power. As a result, the number of simultaneous users in a cell may be increased and consumption of battery power may be minimized. Also, by minimizing cutoff of calls due to a shortage of transmission power, QoS may be improved. In addition, since a modulation and coding scheme is determined, and then call admission is controlled considering the load of the cell and the network, stable service in the entire network may be provided.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A mobile communications system employing an adaptive modulation and coding scheme, the system comprising:
   a base station, which includes:
      a signal-to-noise ratio (SNR) extracting unit which extracts a SNR from a received signal that is processed using a predetermined first modulation and coding scheme;
      a modulation and coding scheme determining unit which compares the extracted SNR with a first requested SNR for the received signal, and determines a second modulation and coding scheme reflecting conditions that include the result of the comparison;
      a power control value determining unit which compares the extracted SNR with a second requested SNR for a signal of the second modulation and coding scheme, and determines a power control value according to the result of the comparison; and
      a signal generating unit which inserts a field indicating the second modulation and coding scheme, and a power control command field corresponding to the power control value, into a data signal to be transmitted, processes a resulting signal according to the second modulation and coding scheme, and generates a transmission signal; and
   a mobile station.

2. The mobile communications system as claimed in claim 1, further comprising a SNR storage unit for storing a plurality of predetermined SNRs requested for signals processed by each modulation and coding scheme.

3. The mobile communications system as claimed in claim 1, wherein the mobile station further includes:
   a command extracting unit which extracts the power control command field and the field indicating the second modulation and coding scheme from the signal transmitted by the signal generating unit;

a processing unit which computes a power level according to a power control command of the power control command field, processes data to be transmitted according to the content of the field indicating the modulation and coding scheme, and generates a signal to be transmitted to the SNR extracting unit in the base station; and an amplifying unit which amplifies the signal generated in the processing unit according to the power level and transmits the amplified signal.

4. A mobile communications system employing an adaptive modulation and coding scheme, the system comprising:
   a signal-to-noise ratio (SNR) extracting unit which extracts a SNR from a received signal that is processed using a predetermined first modulation and coding scheme;
   a modulation and coding scheme determining unit which compares the extracted SNR with a first requested SNR for the received signal, and determines a second modulation and coding scheme reflecting conditions that include the result of the comparison;
   a power control value determining unit which compares the extracted SNR with a second requested SNR for a signal of the second modulation and coding scheme, and determines a power control value according to the result of the comparison;
   a signal generating unit which inserts a field indicating the second modulation and coding scheme and a power control command field corresponding to the power control value, into a data signal to be transmitted, processes a resulting signal according to the second modulation and coding scheme, and generates a transmission signal;
   a command extracting unit which extracts the power control command field and the field indicating the second modulation and coding scheme from the signal transmitted by the signal generating unit;
   a processing unit which computes a power level according to a power control command of the power control command field, processes data to be transmitted according to the content of the field indicating the modulation and coding scheme, and generates a signal to be transmitted to the SNR extracting unit; and
   an amplifying unit which is placed between the SNR extracting unit and the processing unit, which amplifies the signal generated in the processing unit according to the power level, and transmits the amplified signal.

5. The mobile communications system as claimed in claim 4, further comprising a SNR storage unit for storing a plurality of predetermined SNRs requested for signals processed by each modulation and coding scheme.

6. A mobile communications method employing an adaptive modulation and coding scheme, the method comprising:
   (a) extracting a SNR from a received signal which is processed using a predetermined first modulation and coding scheme;
   (b) comparing the extracted SNR with a first requested SNR for the received signal and determining a second modulation and coding scheme reflecting conditions that include the result of the comparison;
   (c) if the second modulation and coding scheme determined in (b) is different from the first modulation and coding scheme, comparing the extracted SNR with a second requested SNR for a signal of the second modulation and coding scheme and determining a power control value according to the result of the comparison; and (d) inserting a field indicating the determined second modulation and coding scheme and a power control command field corresponding to the power control value into a data signal to be transmitted, processing the resulting signal according to the second modulation and coding scheme and generating a transmission signal.

7. The mobile communications method as claimed in claim 6, wherein the first and second requested SNRs are from among a plurality of SNRs stored in a table of SNRs, each SNR being associated with a specific modulation and coding scheme.

8. The mobile communications method as claimed in claim 6, wherein in (c), if the second modulation and coding scheme determined in (b) is the same as the first modulation and coding scheme, the power control value is determined to be adjusted by a predetermined change value as in a conventional fixed step-size closed-loop power control (FCLPC) method.

9. The mobile communications method as claimed in claim 6, further comprising:
   (e) extracting the power control command field and the field indicating a modulation and coding scheme from a signal which is generated and transmitted in (d);
   (f) computing a power level according to the power control command of the power control command field, processing data to be transmitted according to the content of the field indicating the modulation and coding scheme, and generating a signal to be transmitted to the SNR extracting unit; and
   (g) amplifying the signal generated in (f) by the power level and transmitting the signal.

10. A mobile communications method employing an adaptive modulation and coding scheme, the method comprising:
    (a) extracting a SNR from a received signal which is processed using a predetermined first modulation and coding scheme;
    (b) comparing the extracted SNR with a first requested SNR for the received signal, and determining a second modulation and coding scheme reflecting conditions that include the result of the comparison;
    (c) if the second modulation and coding scheme determined in (b) is different from the first modulation and coding scheme, comparing the extracted SNR with a second requested SNR for a signal of the second modulation and coding scheme, and determining a power control value according to the result of the comparison;
    (d) inserting a field indicating the second modulation and coding scheme and a power control command field corresponding to the power control value into a data signal to be transmitted, processing the resulting signal according to the second modulation and coding scheme and generating a transmission signal;
    (e) extracting the power control command field and the field indicating a modulation and coding scheme from a signal which is generated and transmitted in (d);
    (f) computing a power level according to the power control command of the power control command field, processing data to be transmitted according to the content of the field indicating the modulation and coding scheme, and generating a signal to be transmitted to the SNR extracting unit;
    (g) amplifying the signal generated in (f) by the power level and transmitting the signal; and
    (h) repeating (a) through (g).

11. The mobile communications method as claimed in claim 10, wherein the first and second requested SNRs are from among a plurality of SNRs stored in a table of SNRs, each SNR being associated with a unique modulation and coding scheme.

12. The mobile communications method as claimed in claim 10, wherein in (c), if the second modulation and coding scheme determined in (b) is the same as the first modulation and coding scheme, the power control value is determined to be adjusted by a predetermined change value as in a conventional fixed step-size closed-loop power control (FCLPC) method.

* * * * *